United States Patent
Hannah

[11] Patent Number: 5,859,710
[45] Date of Patent: Jan. 12, 1999

[54] DIGITAL COPYING SYSTEM USING A HIGH SPEED DATA BUS WITHOUT THE USE OF DATA BUFFERS

[75] Inventor: Eric C. Hannah, Pebble Beach, Calif.

[73] Assignee: Intel Corporation, Santa Clara, Calif.

[21] Appl. No.: 618,955

[22] Filed: Mar. 20, 1996

Related U.S. Application Data

[60] Provisional application Nos. 60/006,431 Nov. 13, 1995 and 60/011,320 Feb. 8, 1996.

[51] Int. Cl.$^6$ .............................. H04N 1/21; G06F 15/00
[52] U.S. Cl. ............................................. 358/296; 395/114
[58] Field of Search ..................................... 358/296, 400, 358/401, 407, 442, 468, 500; 395/114

[56] References Cited

U.S. PATENT DOCUMENTS

| | | | |
|---|---|---|---|
| 5,231,663 | 7/1993 | Earl et al. | 380/18 |
| 5,532,844 | 7/1996 | Kagami et al. | 358/468 |

OTHER PUBLICATIONS

Universal Serial Bus Specification Revision 1.0, Jan. 15, 1996. Compaq, Digital Equipment Corporation, IBM PC Company, Intel, Microsoft, NEC, Northern Telecom.

IEEE Draft Standard for a High Performance Serial Bus, P1394, D8.ov2, Jul. 1995, DS3285. Institute of Electrical and Electronics Engineers, Inc.

*Primary Examiner*—Peter S. Wong
*Assistant Examiner*—Gregory J. Toatley, Jr.
*Attorney, Agent, or Firm*—William H. Murray; N. Stephan Kinsella

[57] ABSTRACT

A copier for rendering an image of an object onto a physical medium includes a scanner, a printer and an external processor. The scanner and the printer are coupled to the external processor by a high-speed serial bus having a latency and a maximum signal transmission rate sufficient to enable transmission to the external processor of digital image signals generated by the scanner which represent the image of the object without prior interim storage of the digital image signals in a buffer on board the scanner. The high-speed serial bus further has a latency and a maximum signal transmission rate sufficient to enable transmission of the digital image signals from the external processor to the printer for rendering the digital image signals onto the physical medium without prior interim storage of the digital image signals in a buffer on board the printer. In an embodiment, the external processor is capable of processing the digital image signals and the scanner is capable of transmitting the digital image signals without prior on-board digital processing of the digital image signals in the scanner and the printer is capable of rendering the digital image signals without prior on-board digital processing of the digital image signals in the printer.

25 Claims, 2 Drawing Sheets

DIGITAL COPYING SYSTEM USING A HIGH SPEED DATA BUS WITHOUT THE USE OF DATA BUFFERS

CROSS-REFERENCES TO RELATED APPLICATIONS

This non-provisional U.S. national application, filed under 35 U.S.C. §111(a) claims, under 35 U.S.C. §119(e)(1), the benefit of the filing date of provisional U.S. applications nos. 60/006,431, filed under 35 U.S.C. §111(b) on Nov. 10, 1995, and 60/011,320, filed under 35 U.S.C. §111(b) on Feb. 8, 1996, the teachings of both being incorporated herein by reference.

BACKGROUND OF THE INVENTION

1. Field of the Invention

This invention relates to the field of digital copiers.

2. Description of the Related Art

A digital copier generates a digital image of an object, such as a page of printed text, and renders it onto a physical medium, such as a blank sheet of paper. Digital copiers typically include a scanner for generating the digital image of the object. The digital image typically is sent from the scanner to a computer, and ultimately to a printer, which renders the digital image onto the physical medium.

A conventional digital copier 10 is shown in FIG. 1. Conventional digital copier 10 includes conventional scanner 20 and conventional printer 40 each coupled to computer 30 by conventional bus 21. Conventional digital scanner 20 typically includes control processor 22, analog-to-digital (A/D) converter 23 and buffer 24. Printer 40 typically includes ROM 42, control processor 41, buffer 43 and print engine 44. Computer 30, typically includes memory 32 and processor 34.

Scanner 20 further includes a light source 25 for illuminating the image of the object, which can be present on, for example, document 12. Document 12 typically is placed on a platen of scanner 20 (not shown in FIG. 2). Lens 26 forms the image of document 12 onto detector 27. Detector 27 typically includes an array of elements, each of which converts incident light into a charge or analog signal. Detector 27 can be, for example, a photodiode array, a charge-coupled device array or a charge-coupled photodiode device array.

The analog signal generated by detector 27 which represents the image of document 12 is transmitted to A/D converter 23 for conversion into a digital image signal. The digital image signal from A/D converter 23 is coupled to control processor 22. Control processor 22 typically includes hardware and software designed to manipulate the digital image signal from A/D converter 23, for example to filter the digital image signal and to improve image quality. For example, control processor 22 typically performs image enhancement and noise removal on the digital image signal.

Embodiments of control processor 22 also provide signal compression, especially where the digital image signal representing the image of document 12 comprises a large number of bits, such as when document 12 includes color graphics or the like. Control processor 22 also can generate color transforms as necessary, such as by transforming an image in the RGB color space to the YUV or YIQ color space, and may subsample as necessary as a means for compressing the transformed image.

The relatively high latency and low bandwidth of bus 21 limits the rate of transfer of digital image signals from scanner 20 to computer 30 to such an extent that interim storage of the digital image signals is required. On-board buffer 24 is provided for the interim storage. Digital image signals from buffer 24 are transmitted to computer 30 over bus 21 at a rate allowed by bus 21 after bus 21 has been acquired by scanner 20, i.e., after expiration of the latency period of bus 21. When scanning multiple documents in relatively rapid succession, digital image signals from a plurality of images will tend to accumulate in buffer 24, because the latency and bandwidth limitations of bus 21 prevent real-time transfer of the signals. A danger exists that buffer 24 will fill to capacity, resulting in an inability to add additional signals and a loss of some digital image signals. Moreover, the need for including buffer 24 in the hardware of scanner 20 adds to the cost of manufacturing copier 10.

Digital image signals transmitted over bus 21 to computer 30 are transmitted by computer 30 over bus 21 to printer 40. Printer 40 renders digital image signals onto a physical medium.

Continuing to refer to FIG. 1, conventional printer 40 of copier 10 includes control processor 41, read-only memory (ROM) 42, buffer 43 and print engine 44. Generally, during the copying process, digital image signals are transmitted from computer 30 over bus 21 to printer 40. The digital image signals enter the printer and typically are stored in a memory buffer, such as buffer 43.

While in buffer 43, control processor 41 can sort the digital image signals to ensure their correct orientation on the physical medium when rendered. Digital image signals typically remain in buffer 43 until the buffer accumulates a complete page of digital image signals to be rendered, at which point the bit-mapped graphics and text digital image signals can be rendered by print engine 44. Control processor 41 typically arranges digital image signals in the buffer 43 into sequential horizontal lines for printing.

Control processor 41 in conjunction with software stored, for example, in ROM 42, further is capable of manipulating any digital image signals from computer 30 prior to rendering, for example to improve image quality. For example, control processor 41 can perform image enhancement on the digital image signals. Control processor 41 also might decompress a compressed digital image signal transmitted from scanner 20, for example, representing a complex graphics image or the like.

It is evident, therefore, that real-time rendering in conventional copiers depends on the timely provision of print head signals to the print engine of the printer element of the copier. Buffer 43 must be instantly accessible by print engine 44 and filled with digital image signals when print engine 44 is ready to accept data and print. In a conventional digital copier in which the printer element is coupled to the computer through a conventional bus, real time rendering often is unattainable because the relatively high latency and low bandwidth of bus 21 limits the amount of real-time signal transfer to printer 40 from computer 30. In essence, digital image signals generally are not instantly accessible by the print engine in real time. This is especially true for complex or color graphics which require representation by a significant number of bits.

As explained above, real-time rendering often is unattainable in conventional copiers, such as copier 10. Digital image signals generated at a scanning element of the copier, such as scanner 20, back-up into buffer 24 while bus 21 is being acquired. Even after the acquisition of bus 21 after the elapse of its period of latency, bus 21, because of limitations in its maximum rate of digital signal transfer (bandwidth), often is incapable of substantially immediately transmitting all of the digital image signals associated with an image of an object scanned by scanner 20. High latency and low bandwidth constraints imposed by bus 21 between computer 30 and printer 40 additionally affect an ability of copier 10 to render digital images in real time. Typically, acquisition of bus 21 by computer 30 will be delayed and digital image signals can not be transferred fast enough to suit the needs of print engine 44 to print the object in real time.

SUMMARY OF THE INVENTION

A copier for rendering an image of an object onto a physical medium includes a scanner, a printer and an external processor. The scanner and the printer are coupled to the external processor by a high-speed serial bus having a latency and a maximum signal transmission rate sufficient to enable transmission to the external processor of digital image signals generated by the scanner which represent the image of the object without prior interim storage of the digital image signals in a buffer on board the scanner. The high-speed serial bus further has a latency and a maximum signal transmission rate sufficient to enable transmission of the digital image signals from the external processor to the printer for rendering the digital image signals onto the physical medium without prior interim storage of the digital image signals in a buffer on board the printer.

BRIEF DESCRIPTION OF THE DRAWINGS

The following detailed description will be more fully understood with reference to the accompanying drawings in which.

DETAILED DESCRIPTION OF PREFERRED EMBODIMENTS

Figure 2:
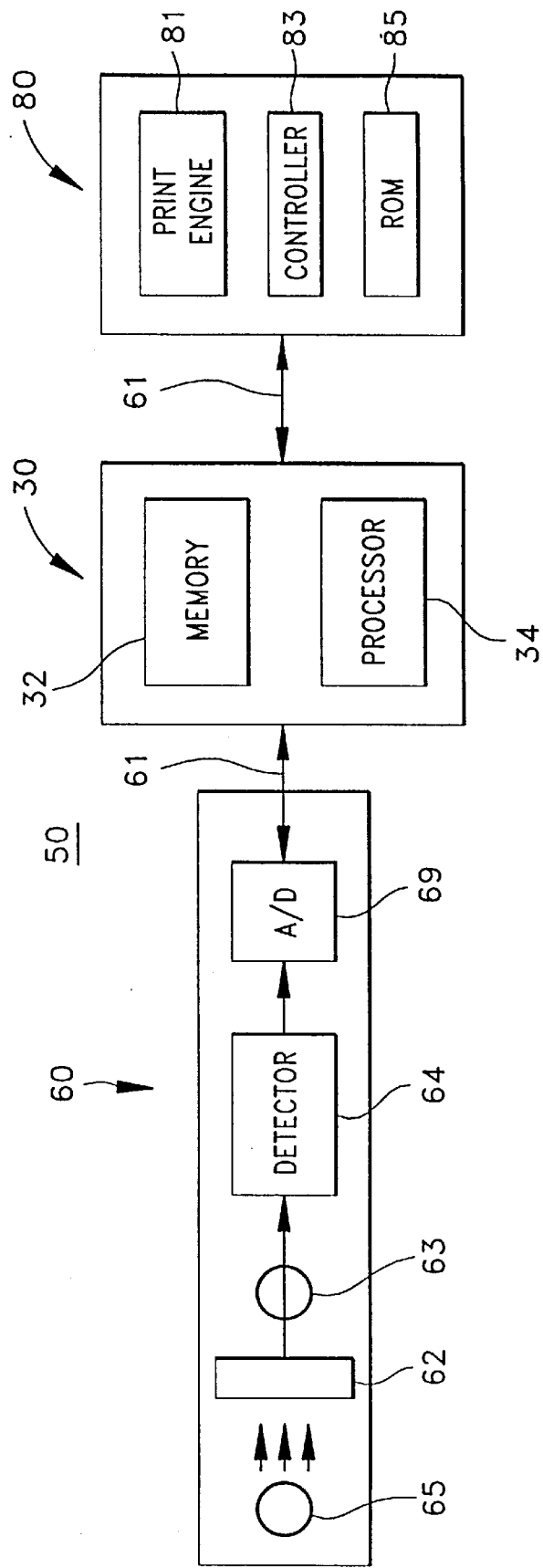
FIG. 2 is functional block diagram of a copier of the invention having scanner and printer elements coupled to a computer using a high-speed serial bus.

Referring to FIGS. 2, a substantial cost reduction in digital copiers is possible through the use of a new high-speed serial bus which provides low latency and high bandwidth. A bus of this type is disclosed in U.S. Provisional Applications Nos. 60/006,431, filed on Nov. 10, 1995, and 60/011,320, filed on Feb. 8, 1996, incorporated herein by reference.

Copier 50 includes elements such as scanner 60, computer 30 and printer 80. Scanner 60 and printer 80 are coupled to computer 30 through high-speed serial bus 61. Scanner 60 has light source 65 for illuminating document 62 being scanned. An image of document 62 is focused on detector 64 by lens 63 in a known manner. Detector 64 typically includes an array of elements for converting incident light into a charge or analog signal representing the image of document 62. The image of document 62 may be text, graphics or a combination of both. The analog signal generated by detector 64 is converted into a digital image signal representing the image of document 62 by A/D converter 69.

Scanner 60 is coupled to computer 30 through high-speed serial bus 61. Bus 61 has a large bandwidth, permitting signal transfer between scanner 60 and computer 30 at a very high rate, such as 800 Megabits per second (Mbits/sec). Bus 61 further has a low latency, thereby enabling substantially immediate access of bus 61 by scanner 60 for signal transfer to, for example, computer 30.

Figure 1:
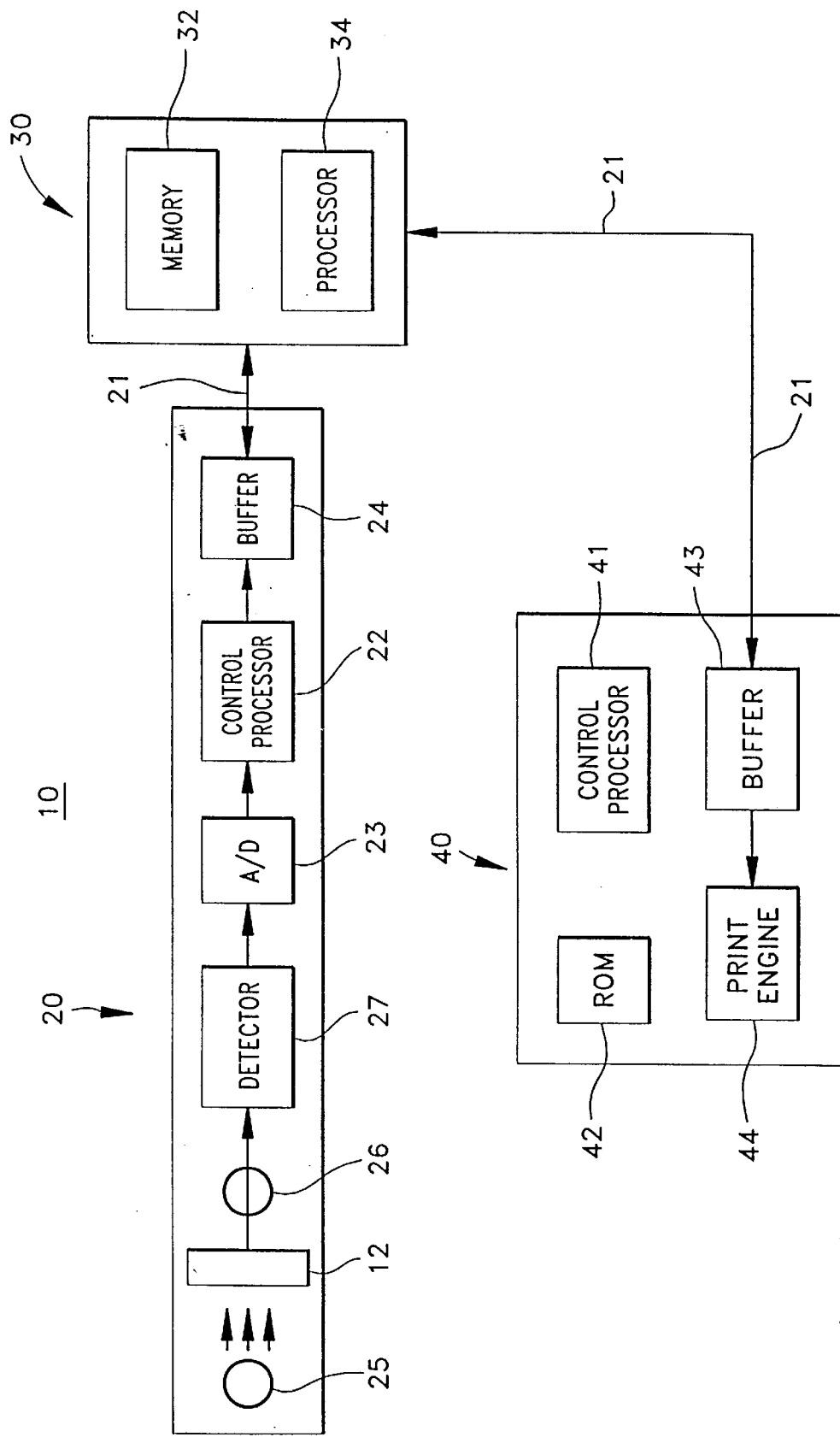
FIG. 1 is a functional block diagram of a conventional copier having scanner and printer elements coupled to a computer using a conventional bus.

The relatively high bandwidth and low latency of bus 61 eliminates the need for an internal buffer in scanner 60, such as buffer 24 in conventional scanner 20 of copier 10 of FIG. 1, since bus 61 can be quickly acquired and can transmit digital image signals essentially at a real-time rate, i.e., as they are generated by A/D converter 69 of scanner 60. Bus 61 permits real-time transfer of the digital image signals to computer 30, where they may be digitally processed and forwarded to printer 80 as more fully described below. The design of scanner 60, in association with bus 61, therefore eliminates the danger that digital image signals will "back up" in an on-board buffer to the point of saturation of the buffer, resulting in signal loss. Furthermore, manufacturing costs of copier 50 are kept down, since scanner 60 can be constructed without relatively expensive memory chips to be used as interim storage buffers.

The relatively high bandwidth and low latency of bus 61 further enables transmission of digitized image signals from A/D converter 69 of scanner 60 at a rate sufficient for real-time, high-resolution digital imaging processing of the signals by processor 34 of computer 30. Processor 34 thus can employed to perform digital imaging processing on the digital image signals transmitted from scanner 60, in lieu of on-board digital processing of the signals by a processor in the scanner, such as control processor 22 in conventional scanner 20. Accordingly, scanner 60 can be manufactured without internal dedicated digital processing hardware and software, as is known in conventional scanners, further suppressing manufacturing costs for copier 50 in comparison with conventional digital copiers.

On-board digital processors, such as control processor 22 in conventional scanner 20, typically use fixed algorithms for image enhancement, thereby precluding any ability to vary or customize the extent and quality of image enhancement as needs might dictate. Furthermore, the need for maintaining conventional copier costs within a reasonable ceiling necessarily limits the complexity of the control processors 22 and software which may be installed in scanner 20 of copier 10, consequently limiting the sophistication of digital image processing routines which may be run on the digital image signals. The large storage capacity of memory associated with a host computer, such as memory 32 of computer 30, and powerful digital processing capabilities of processor 34 of computer 30 (which capabilities continue to rapidly advance) enable running of plural and/or complex digital image processing applications on the digital image signals generated by scanner 60 of copier 50. Processor 34 can process the digital image signals, for example, by executing filtering and image enhancement routines as well as digital signal compression and color transformation routines on the digital image signals.

Scanner 60 of copier 50 therefore transmits unprocessed raw digital image signals over bus 61 to computer 30 for subsequent digital processing, which may be in real time if so required. Digital image signals from scanner 60 therefore preferably are processed by the powerful and flexible image-processing capabilities of, for example, processor 34 of computer 30, prior to being transmitted to printer 80 of copier 50.

Copier 50 including scanner 60 represents a significant improvement in conventional copier technology. Substantial cost savings to the copier as a whole can be realized by the elimination of on-board hardware in the scanner, such as the elimination of control processors and signal storage buffers. Furthermore, copy quality improvements no longer are dependent on expensive improvements to scanner hardware and software but essentially are wholly reliant on improvements to, for example, computer processor 34 and software running on computer processor 34. Significantly, computer processor technology continues to rapidly advance, and as it does, so will improvements to the quality of renderings made by copier 50.

The coupling of printer 80 to computer 30 through a high-speed serial bus such as the bus disclosed in U.S. Provisional Applications Nos. 60/006,431, filed on Nov. 10, 1995, and 60/011,320, filed on Feb. 8, 1996, incorporated herein by reference, enables substantial changes to be made to printer 80 which benefit copier 50 as a whole in terms of cost and copy quality.

Printer 80 has print engine 81 for physically rendering onto a physical medium an image represented by a digital image signal generated by scanner 60. The image may be text, graphics or a combination of both.

Printer 80 is coupled to computer 30 through high speed serial bus 61. Bus 61 permits high-speed data transfer between printer 80 and computer 30, e.g., at a rate of around 800 Megabits per second (Mbits/sec). Bus 61 further has a low latency, thereby enabling substantially immediate access of bus 61 by computer 30 for data transfer to, for example, printer 80.

Bus 61, having a relatively high bandwidth and low latency, can transmit digital image signals essentially at a real time rate, and in any event as needed by print engine 81. Bus 61 therefore permits real time rendering of images of objects which have been scanned by scanner 60 and transmitted to computer 30, thus providing real-time rendering by copier 50. Bus 61 further eliminates the need for any internal buffers in printer 80, such as buffer 43 in conventional printer 40 of FIG. 1.

Printer 80 thus can be constructed without any on-board interim storage devices, such as buffer 43 found in conventional printer 40 of conventional copier 10. In an embodiment, processor 34 of computer 30 processes the digital image signals received from scanner 60 before transmitting them directly to print engine 81. Print engine 81 of printer 80 therefore receives processed digital image signals ready for rendering directly from computer 30 at a rate sufficient to support high resolution real-time rendering, without the conventional requirement that on-board buffers hold the digital image signals for substantially immediate access as needed by print engine 81. Manufacturing costs of copier 50 are kept down, since the printer component of copier 50, such as printer 80, can be constructed without relatively expensive memory devices.

As noted, the relatively high bandwidth and low latency of bus 61 enables transmission of high-resolution digital signals which preferably have been processed by microprocessor 34 of computer 30 directly to print engine 81 for rendering in real-time. In fact, the elimination of on-board buffers from printer 80 of copier 50 essentially requires such processing by microprocessor 34, since print head signals are being sent directly from computer 30 to print engine 81, thereby precluding any opportunity for on-board processing of the signals by printer 80. Processor 34 thus is advantageously employed to perform digital imaging processing on the digital image signals, in lieu of on-board digital processing in the printer, such as is typically performed by control processor 41 in printer 40 of conventional copier 10 shown in FIG. 1. Accordingly, printer 80 can be manufactured without internal dedicated processing hardware and software, as is known in conventional printers, further suppressing manufacturing costs for copier 50 in comparison with conventional copiers, such as copier 10. Of course relatively simple processing devices, such as controller 83 and software in ROM 85 may remain to monitor and control the printer's operability, such as by running diagnostic routines and self-tests.

On-board digital processors in conventional printers, such as control processor 41 in printer 40, typically use fixed algorithms stored in ROM 42 for image enhancement, generation of print head signals such as bit-maps, and decompression, thereby precluding any ability to vary or customize the extent and quality of enhancement and resolution of the rendered images beyond what has been preprogrammed. Furthermore, the need for maintaining conventional copier costs within a reasonable ceiling necessarily limits the complexity of, for example, control processor 41, the size of ROM 42 and correspondingly, the quantity of software stored in ROM 42, consequently limiting the sophistication, amount and types of digital image processing and print head signal preparation routines which may be run on the digital image signals. The large storage capacity of memory associated with a host computer, such as memory 32 of computer 30, and powerful processing capabilities of processor 34 of computer 30 (which capabilities continue to rapidly advance) enable running of plural and/or complex decompression, image enhancement and print head signal generation applications, among others, on the digital image signals to be rendered by printer 80. Computer 30 is able through high-speed serial bus 61 to transmit processed signals digital directly to print engine 81 of printer 80 in accordance with the need of print engine 81 to be timely supplied in real time with such signals. Signals to be printed by printer 80 therefore are preferably processed by the powerful and flexible processor 34 of computer 30, rather than with a printer's less capable internal hardware and software combinations.

Printer 80 represents a significant improvement over conventional printer technology, thereby substantially improving copier 50 of which it is a part. Substantial cost savings can be realized by the elimination of on-board printer hardware, such as control processors and buffers. Furthermore, image quality and resolution improvements no longer are dependent on expensive improvements or upgrades of printer hardware and software but essentially are wholly reliant on improvements to, for example, computer processor 34 and software in computer memory 32. Significantly, computer processor technology continues to rapidly advance, and as it does, so will improvements to the quality of the renderings of printer 80.

Copier 50, having scanner 60 and printer 80 thus is able to render digital image signals in real time. Images scanned at scanner 60 are converted to digital image signals and transmitted in real time, without interim storage in buffers, to computer 30 over high-speed serial bus 61. Computer 30, having processor 34, can digitally process the digital image signals as necessary, in real time, and transmit them in real time over bus 61 to printer 80. Printer 80 preferably renders the images onto a physical medium, without prior interim storage of the received digital image signals in a local buffer. Any digital processing previously done in scanner 60 and printer 80 can be moved to computer 30 without affecting the ability of copier 50 to render in real time. Of course, only one of scanner 60 and printer 80 need be coupled via high-speed bus 61 to computer 30 in order to obtain some benefits, such as the elimination of on-board buffers and processors from the component so coupled. However, to fully realize the benefits of the invention, it is preferable to couple both scanner 60 and printer 80 to computer 30 through high-speed serial bus 61.

It should be understood that the scanning and printing phase need not occur immediately consecutively in time. For example, it is within the scope of the invention to scan an image and transmit over the high-speed serial bus the resulting digital image signal into, for example portable computer memory for later transmission, preferably over a high-speed serial bus, to a printer for rendering.

For purposes of this disclosure digital signal processing does not include analog-to-digital and digital-to-analog signal conversion.

It should also be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A copier for rendering an image of an object onto a physical medium, comprising:
    (a) a scanner;
    (b) a printer; and
    (c) an external processor, wherein:
        the scanner and the printer are coupled to the external processor by a high-speed serial bus having a latency and a maximum signal transmission rate sufficient to:
            enable transmission to the external processor of digital image signals generated by the scanner which represent the image of the object without prior interim storage of the digital image signals in a buffer on board the scanner and;
            enable transmission of the digital image signals from the external processor to the printer for rendering the digital image signals onto the physical medium without prior interim storage of the digital image signals in a buffer on board the printer.

2. The copier of claim 1, wherein a separate internal full-frame buffer is absent from at least one of the scanner and the printer.

3. The copier of claim 1, wherein the maximum signal transmission rate of the high-speed serial bus is high enough and the latency of the high-speed serial bus is low enough to transmit the digital image signals in real time.

4. The copier of claim 1, wherein the maximum signal transmission rate of the high-speed serial bus is high enough and the latency of the high-speed serial bus is low enough to transmit the digital image signals to the printer at a rate required by the printer.

5. The copier of claim 1, wherein the scanner is capable of transmitting the digital image signals to the external processor over the high-speed serial bus in real time, the external processor is capable of processing the digital image signals in real time, and the printer is capable of receiving the digital image signals over the high-speed serial bus and rendering the digital image signals onto the physical medium in real time.

6. The copier of claim 1, wherein the external processor is capable of processing the digital image signals and the scanner is capable of transmitting the digital image signals without prior on-board digital processing of the digital image signals in the scanner and the printer is capable of rendering the digital image signals without prior on-board digital processing of the digital image signals in the printer.

7. The copier of claim 6, wherein a separate internal digital image signal processor is absent from at least one of the scanner and the printer.

8. The copier of claim 6, wherein the image comprises graphics and the external processor can perform at least one of digital image signal compression, color transformation from an RGB format to one of a YUV and YIQ format, digital image signal decompression and image enhancement.

9. The copier of claim 1, wherein the high-speed serial bus has a maximum digital signal transmission rate of at least 750 Megabits per second.

10. The copier of claim 7, wherein a separate internal full-frame buffer is absent from at least one of the scanner and the printer and the scanner is capable of transmitting the digital image signals to the external processor over the high-speed serial bus in real time, the external processor is capable of processing the digital image signals in real time, and the printer is capable of receiving the digital image signals over the high-speed serial bus and rendering the digital image signals onto the physical medium in real time.

11. A method for rendering an image of an object onto a physical medium, comprising the steps of:
    (a) generating digital image signals representing the image of the object using a scanner;
    (b) transmitting the digital image signals from the scanner to an external processor;
    (c) processing the digital image signals by the external processor;
    (d) transmitting the processed digital image signals from the external processor to a printer; and
    (e) printing processed digital image signals onto the physical medium by the printer, wherein:
        steps (b) and (d) each comprise the step of transmitting digital image signals over a high-speed serial bus and steps (b) and (e) occur without prior local interim storage of the digital image signals in a local interim storage device.

12. The method of claim 11, wherein steps (b) and (e) occur without local processing of the digital image signals.

13. The method of claim 11, wherein at least one of steps (b) and (d) comprise transmitting the digital image signals in real time.

14. The method of claim 11, wherein step (d) comprises the step of transmitting the digital image signals at a rate required by the printer.

15. The method of claim 11, wherein steps (a)–(e) occur substantially in real time.

16. The method of claim 11, wherein step (c) comprises the step of at least one of:
    (1) digital signal compression;
    (2) color transformation from an RGB format to one of a YUV and YIQ format;
    (3) digital signal decompression; and
    (4) image enhancement.

17. The method of claim 11, wherein the high-speed serial bus has a maximum digital signal transmission rate of at least 750 Megabits per second.

18. A copier for rendering an image of an object onto a physical medium, comprising:
    (a) means for generating digital image signals representing the image of the object using a scanner;
    (b) means for transmitting the digital image signals from the scanner to an external processor;
    (c) means for processing the digital image signals;
    (d) means for transmitting the processed digital image signals from the external processor to a printer; and
    (e) means for printing processed digital image signals onto the physical medium, wherein:
        means (b) and (d) have a latency and a maximum signal transmission rate sufficient to:

enable transmission to the external processor of digital image signals generated by the scanner which represent the image of the object without prior interim storage of the digital image signals in a storage means in the scanner; and enable transmission of the processed digital image signals from the external processor to the printer for rendering the processed digital image signals onto the physical medium without prior interim storage of the digital image signals in storage means in the printer.

19. The copier of claim 18, wherein a separate full-frame interim storage means is absent from at least one of the scanner and the printer.

20. The copier of claim 18, wherein means (b) and (d) comprise a high-speed serial bus having a latency and a maximum signal transmission rate sufficient to:

enable transmission to the external processor of digital image signals generated by the scanner which represent the image of the object without prior digital processing of the digital image signals in processing means in the scanner; and enable transmission of the processed digital image signals from the external processor to the printer for rendering the processed digital image signals onto the physical medium without prior digital processing of the digital image signals in processing means in the printer.

21. The copier of claim 20, wherein a separate digital processing means for processing the digital image signals is absent from the scanner and the printer.

22. The copier of claim 18, wherein means (d) transmits the digital image signals at a rate required by the printer.

23. The copier of claim 18, wherein means (a)–(e) operate substantially in real time.

24. The copier of claim 18, wherein means (c) comprises means for at least one of:

(1) digital signal compression;

(2) color transformation from an RGB format to one of a YUV and YIQ format;

(3) digital signal decompression; and (4) image enhancement.

25. The copier of claim 18, wherein means (b) and (d) have a maximum digital signal transmission rate of at least 750 Megabits per second.

* * * * *